March 17, 1953     R. W. DUNHAM     2,631,690
TWO-WAY ROTARY MOTION SHOCK RESISTING DEVICE
Filed Aug. 25, 1949
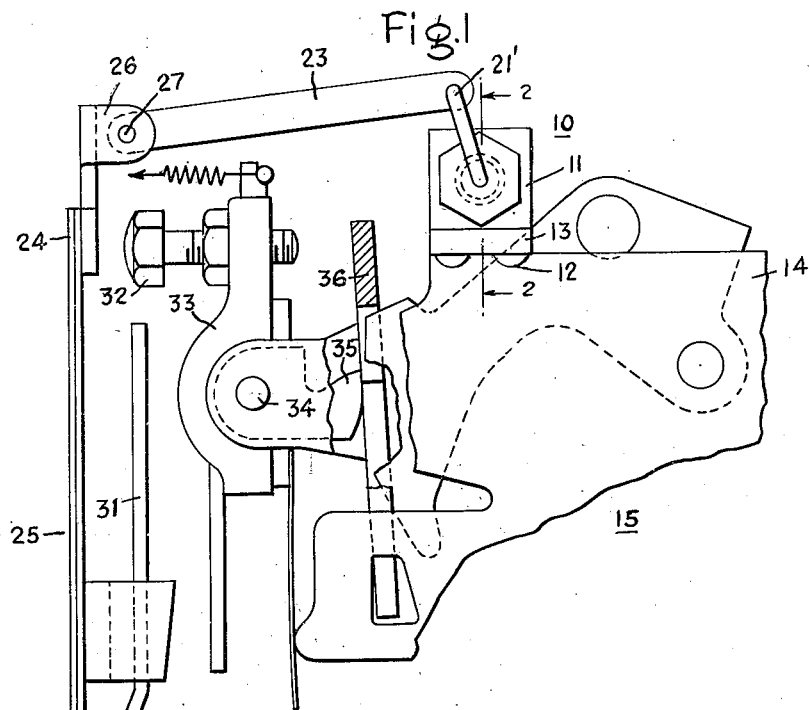
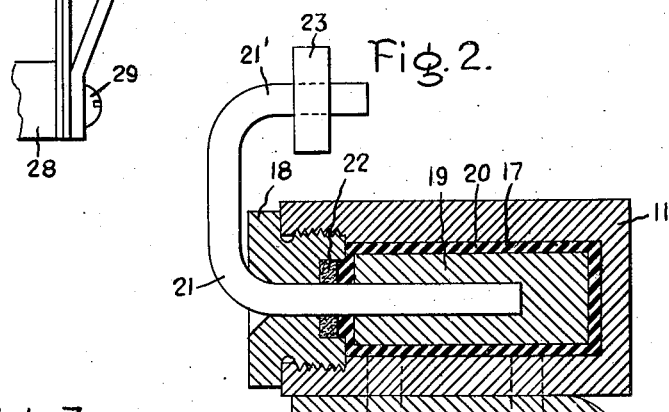
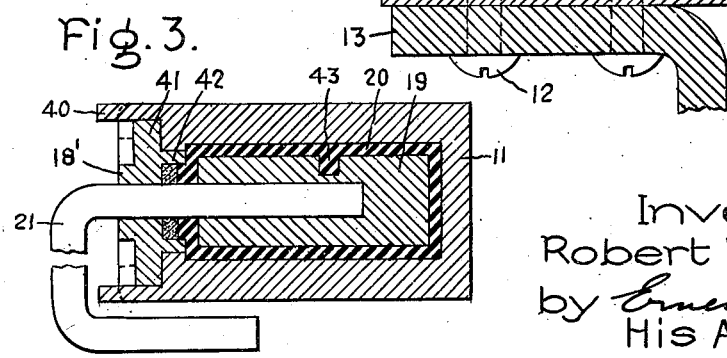
Inventor:
Robert W. Dunham,
by Ernest H. Britton
His Attorney.

Patented Mar. 17, 1953

2,631,690

UNITED STATES PATENT OFFICE 2,631,690

TWO-WAY ROTARY MOTION SHOCK RESISTING DEVICE

Robert W. Dunham, Drexel Hill, Pa., assignor to General Electric Company, a corporation of New York Application August 25, 1949, Serial No. 112,189

5 Claims. (Cl. 188—1)

The invention relates to rotary motion retarding devices and the principal object is to provide an improved two-way rotary motion shock resisting device suitable for connection with circuit breaker current-responsive time-delay trip elements to prevent false operation thereof by shock or vibration without appreciably interfering with the normal calibration and gradual operation thereof or for use in other reversible two-way sudden rotary motion resisting or shock absorber service.

Another object is to provide a nesting cylindrical spaced-apart two-way rotary motion shock resisting structure dependent upon the motion selective shearing response characteristic of a filling in the annular space therebetween of silicone bouncing putty, namely, its relatively large resistance to any sudden shearing movement while exerting a negligible restraint or relatively small resistance to a gradual continued shearing movement.

Other objects and advantages of the invention will appear in the following description of the accompanying drawings in which Fig. 1 is a side view showing the improved rotary motion shock retarding device applied to the current responsive time delay bimetal operating element of a circuit breaker trip mechanism; Fig. 2 is a sectional view on line 2—2 of the silicone putty selective rotary-motion shock retarding device showing the relatively simple and inexpensive construction thereof; and Fig. 3 shows a further simplified construction.

As shown in Fig. 1, the improved selective rotary motion shock retarding device indicated generally by the reference character 10 is provided with a mounting block member or enclosing casing 11 adapted to be readily mounted by means of the holding screws 12 on a bracket 13 extending from the frame 14 of a circuit breaker indicated generally by the reference character 15 and which may be of any suitable type. Hence, the detail structure of the circuit breaker trip mechanism is only partially shown in the drawings. As more clearly shown in the sectional view of Fig. 2, the fixed member or enclosing casing 11 has an open end elongated cylindrical chamber 17 formed therein and the bearing plug 18 is screw-threaded into the block 11 to close the open end of the cylinder.

A relatively rotatable member 19 is mounted in nested spaced-apart relation inside the chamber 17 and the member 19 preferably is of coaxial cylindrical form and provided with a knurled or fluted periphery so as to insure intimate contact with the filling of silicone bouncing putty 20 that is interposed in the annular space between the outer cylindrical periphery of member 19 and the inner cylindrical perimeter of the chamber 17.

Silicone putty is now readily available on the market and has unusual "bounce" properties that are believed to arise from a balance between the hydrophilic and hydrophobic groups embodied therein as more fully described in the copending patent application of James G. E. Wright, Serial No. 569,647, filed December 23, 1944, upon which Patent No. 2,541,851 was granted February 13, 1951. The combination of organic and inorganic radicals and elements in the bouncing putty composition provides the unique combination of properties including both a high degree of elasticity, or bounce, under suddenly applied stresses and a high degree of plasticity when the stress is applied more slowly. Thus, under sharp impacts the bouncing putty resists almost like an elastic solid but when subjected to a gradual pressure, the internal friction is readily overcome so that the material readily flows and thus enables the motion-selective shearing response characteristics of the improved selective rotary shock retarding device of the present invention to be obtained.

The inner relatively rotatable member 19 has an operating crankshaft 21 extending through and journaled in the bearing plug 18 with a sealing washer 22 inserted in a suitable recess formed in the plug to surround the shaft 21. The crankshaft 21 is provided with a reversely bent end 21' for pivotal engagement with the link 23 that serves to connect the selective rotary motion retarding device 10 with the free end 24 of the current responsive time-delay bimetal trip operating element 25 of the circuit breaker 15. For this purpose the clevis 26 is carried by the free end 24 of the bimetal element and pivotally connected with the link 23 by means of the pin 27.

In the typical circuit breaker trip mechanism illustrated, the bimetal tripping element 25 is of the usual hairpin type and the two lower ends thereof are fixedly mounted in conducting relation with separate current conducting parts 28 by means of the mounting screws 29, one being directly behind the other as shown in Fig. 1, so that current will flow through the hairpin bimetal element 25. A current calibrating shunt 31 may be interconnected between the current-conducting parts 28 in parallel with the hairpin-shaped bimetal element 25, if desired.

In operation, when the bimetal tripping element 25 is subjected to an overload current, the free end 24 thereof tends to move with a time delay corresponding to the time required for heating of the bimetal element 25 to the right into engagement with the adjustable tripping finger 32 carried by the trip member 33 that is pivotally mounted on the shaft 34 and has the latch 35 engaging with the circuit breaker holding member 36. In this way, the latch 35 is disengaged from the circuit-holding member 36, thereby releasing the circuit breaker for operation to the circuit opening position. Due to the relatively small resistance or negligible restraint of the silicone putty 20 to the gradually applied force, the movement of the free end 24 of the bimetal element 25 to the right is practically unimpeded by the shock absorber 10. In case the overload should be only temporary so that the current returns to normal before the circuit breaker is tripped, then the free end 24 of the bimetal tripping element 25 will gradually move in the opposite direction so as to return to its normal position with negligible restraint by the shock absorber 10. Thus, there is no appreciable restraint or interference with the calibration and reversible operation of the bimetal element 25 under normal conditions.

However, when the circuit breaker 15 is used in service where it is likely to be subjected to severe and sudden shock or vibration, as, for example, on a war ship or on a vehicle, shock or vibration in either direction may cause the free end 24 of the bimetal strip 25 to suddenly vibrate sufficiently to actuate the circuit breaker trip mechanism in the absence of an overload current except for the provision of the shock absorber 10. Under such shock or vibration conditions, any sudden relative rotary movement in either direction between the enclosing member 11 and the nested member 19 is effectively prevented by the silicone putty 20 that is interposed in the space therebetween. Thus, the provision of the simple and inexpensive form of shock absorber of the present invention enables the circuit breaker to be rendered sufficiently shockproof to pass all of the standard shock tests prescribed by Navy specifications and eliminates the complications and expense of mechanically counterbalancing the bimetal trip element 25 as heretofore required.

If desired, the same two-way rotary motion selective retarding action may be obtained in case the inner relatively movable member 19 is fixed and the outer member 11 moved relatively thereto and arranged to be connected to the free end 24 of the bimetal trip operating element 25.

In the modification shown in Fig. 3, the block or enclosing casing 11, inside of which the rotor 19 is nested with the silicone putty material 20 interposed therebetween, is provided with the projecting lips 40 that can be bent or peened over the projections 41 formed on the modified plug 18', as indicated by the dotted lines, so as to secure the plug in fixed position to close the open end of the cylinder formed inside the block 11. The modified bearing plug 18' also is provided with a laterally projecting annular collar 42 that fits inside of the cylinder so as to accurately center the shaft 21 and retain the washer 22 in sealing engagement therewith. The rotor 19 may be fixed to the shaft 21 by punching a depression 43 in one side of the rotor so as to firmly pinch the shaft.

What I claim as new and desire to secure by Letters Patent of the United States is:

1. In combination, a condition responsive operating element having gradual movement in opposite directions under predetermined conditions and a sudden movement in either direction under shock conditions, a pair of nesting relatively rotatable members having spaced-apart inner and outer cylindrical perimeters, two-way operating connections between the operating element and one of the members, and a filling of silicone putty interposed in the space between said members for selectively preventing the sudden movement of the operating element in either direction when shock is transmitted from the operating element through the connections while exerting a negligible restraint to the gradual movement of the operating element in either direction.

2. In combination, a body provided with an inner cylindrical perimeter, a cylindrical member mounted for coaxial rotation in spaced-apart relation inside the cylindrical perimeter of the body, a bimetal thermo-responsive operating element, means for mounting the body and the element subject to shock, two-way operating connections between the element and the member for gradually rotating the member in opposite directions upon corresponding variation in the temperature of the element, and a filling of silicone putty interposed in the space between the cylindrical member and the cylindrical inner perimeter of the body for preventing sudden rotation of the member in either direction when shock is transmitted from the operating element through the connections while exerting negligible restraint to the gradual rotation of the member in either direction.

3. In combination, a body provided with an inner cylindrical chamber open at one end, a plug for closing the open end of the chamber, a cylindrical member mounted for coaxial rotation in spaced-apart relation inside the chamber and having an axial mounting shaft extending through the plug, a variable condition gradual responsive device having relatively movable parts, means for fixedly mounting the body and one of the parts, two-way shock transmitting connections between the other part and the shaft for gradually rotating the member in opposite directions upon corresponding relative movement of the other part in gradual response to variations of the condition, and a filling of silicone putty interposed in the space between the member and the walls of the cylindrical chamber for preventing a sudden relative movement of the parts of the variable condition responsive device in either direction when shock is transmitted through the connections while exerting negligible restraint to gradual relative movement of the parts of the condition responsive device in either direction.

4. In combination, a block having an elongated cylinder formed therein and open at one end, a plug for closing the open end of the cylinder, a cylindrical member mounted for coaxial rotation in spaced-apart nesting relation inside the cylinder and having an operating crank shaft rotatably mounted in the plug, a variable condition gradual responsive operating device having relatively movable parts, means for fixedly mounting the block and one of the parts, a two-way rigid shock transmitting connection between the other part and the crank shaft for gradually rotating the cylindrical member in opposite directions upon corresponding relative movement of the parts, and a filling of silicone putty interposed in the space between the cylindrical member and the walls of the cylinder for preventing a sudden relative movement of the parts of the device in either direction when shock is transmitted through the connection while exerting negligible restraint to gradual relative movement of the parts in either direction.

5. In combination, a current responsive bimetal element having one end fixedly mounted subject to shock and the free end gradually movable in opposite directions upon corresponding variations of the temperature of the element, a pair of relatively rotatable inner and outer members in nesting spaced-apart relation, means for fixedly mounting one of the members subject to shock, a two-way shock transmitting connection between the free end of the bimetal element and the other member for rotating the other member in either direction upon corresponding gradual movement of the free end of the element, and a filling of silicone putty interposed in the space between the members for preventing a sudden relative movement of the free end of the bimetal element in either direction when the bimetal element is subjected to shock while exerting a negligible restraint to gradual movement of the free end of the bimetal element in either direction.

ROBERT W. DUNHAM.

REFERENCES CITED

The following references are of record in the file of this patent:

UNITED STATES PATENTS

| Number | Name | Date |
| --- | --- | --- |
| 431,035 | Daft | July 1, 1890 |
| 470,161 | Wurto | Mar. 1, 1892 |
| 815,074 | De Wilde | Mar. 13, 1906 |
| 1,114,691 | Herz | Oct. 20, 1914 |
| 2,406,325 | Dorfman | Aug. 27, 1946 |
| 2,416,163 | Dyer et al. | Feb. 18, 1947 |
| 2,460,116 | Bazley | Jan. 25, 1949 |
| 2,507,182 | Young | May 9, 1950 |